Oct. 14, 1947.　　　　L. R. THOMAS　　　　2,429,142
ROLLER LEVELLER MACHINE
Filed May 12, 1944　　　　6 Sheets-Sheet 6

INVENTOR.
LLOYD R. THOMAS
BY Kwis Hudson Boughton & Williams
ATTORNEYS

Patented Oct. 14, 1947

2,429,142

UNITED STATES PATENT OFFICE 2,429,142

ROLLER LEVELER MACHINE

Lloyd R. Thomas, Youngstown, Ohio, assignor to The Youngstown Foundry and Machine Company, Youngstown, Ohio, a corporation of Ohio Application May 12, 1944, Serial No. 535,387

18 Claims. (Cl. 153—54)

The present invention relates to machines for processing metallic sheets and, more particularly, to power-actuated roller levelers, especially power-actuated roller levelers of the type used by manufacturers of metallic sheets to remove rippled edges, bubbles, etc., caused by imperfect rolling, and by fabricators of metallic sheets to remove the "set" ordinarily occurring therein prior to fabrication as by dies and the like.

Roller levelers operate by rolling short corrugations in the metallic sheets being processed at or adjacent to the entrance end of the machine and by progressively rolling out these corrugations until at the exit end of the machine the sheet is level and in a so-called plastic condition or free from "set." The plastic condition is brought about by the reverse flexing of the material as it passes through the roller leveler. Other conditions being the same, the smaller the diameter and the closer together the work rollers of the roller leveler are, the shorter will be the corrugations and the greater will be the flexing of the sheet and the work performed thereon, with the result that the sheet will be more plastic, however, the smaller the diameter of the work rolls and the closer they are together for any given width of machine, the smaller will be the roll necks and the higher will be the bearing loads with the disadvantages incident thereto and the greater will be the deflection of the rolls. Metallic sheets are more workable and the breakage thereof during fabrication, as by dies and the like, is less when the material is plastic or free from "set," however, if the sheets are not fabricated within a limited time after being made plastic, the "set" reoccurs therein and must be again removed prior to fabrication, which accounts for the extensive use of roller levelers by fabricators.

The principal object of the present invention is the provision of a novel and improved roller leveler, the work rolls of which will be relatively small and have relatively large necks and low bearing pressures and in which the deflection of the work rolls is provided for in such a manner that the roller leveler will not only effect better leveling and greater plasticity but will produce the aforesaid results at a higher speed and at a lower cost than has heretofore been possible.

A more specific object of the invention is the provision of a novel and improved power-actuated roller leveler of the type referred to comprising work rolls of relatively small diameter having relatively large necks and special type self-adjusting bearings for the work rolls.

Another object of the invention is the provision of a novel and improved roller leveler of the type referred to comprising work rolls of relatively small diameter and back-up rollers therefor frictionally driven therefrom, which back-up rollers are mounted in individual housings or the equivalent thereof and continuously urged into contact with the work rolls so as to be in contact therewith at all times and continuously driven thereby, thus eliminating chafing and scoring of the rolls and rollers due to a difference in speed therebetween.

Another object of the invention is the provision of a novel and improved power-actuated roller leveler of the type referred to comprising work rolls of relatively small diameter having relatively large necks and in which the predeflection and deflection of the work rolls is provided for by individually self-adjusting bearings of special construction for the work rolls and by frictionally driven back-up rollers so arranged that they are continuously in contact with the work rolls, thus minimizing or eliminating chafing and wear therebetween.

The invention resides in certain constructions and combinations and arrangements of parts and further objects and advantages thereof will be apparent to those skilled in the art to which the invention relates from the following description of the preferred embodiment of the invention hereinafter described with reference to the accompanying drawings forming a part of this specification in which similar reference characters designate corresponding parts and in which:

While the invention is susceptible of various embodiments and alternative constructions, it is herein shown and described as embodied in a 3" x 72" x 4 high roller leveller having two banks of back-up rolls for each set of work rolls;

however, it is to be understood that the invention is not limited to the particular construction shown herein, which consruction is intended to be merely illustrative of the invention.

Figure 1:
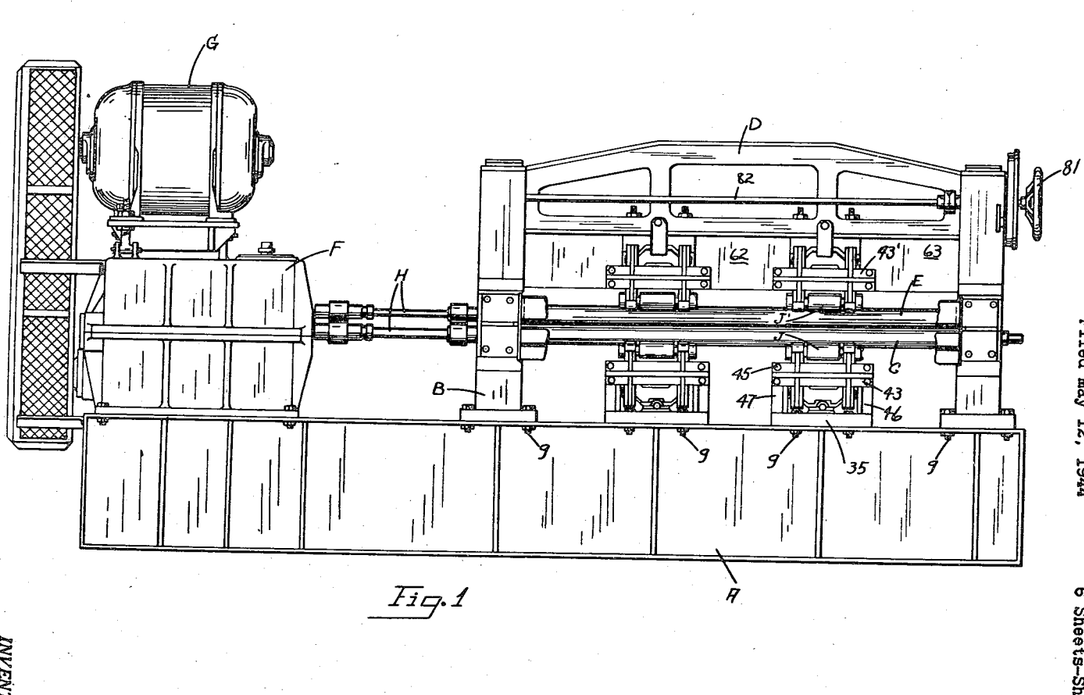
Fig. 1 is a front elevational view, with portions broken away, of a roller leveler embodying the present invention.

Generally speaking, the frame of the roller leveler shown is made of welded-up steel plates, etc., and comprises a base or bed A, a lower roll housing B in which the lower set of work rolls C comprising a plurality of rolls arranged in tandem relation are rotatably supported, and an upper roll housing D which carries the upper set of work rolls E which also comprises a plurality of rolls aranged in tandem relation. The lower roll housing B rests upon the right-hand end of the bed A and is secured thereto as by the bolts 9, and the upper roll housing D is carried by the housing B. The sets of work rolls are so arranged in offset relation that they define or form a sinuous "pass" therebetween for the material to be processed thereby and the upper housing D is movable vertically with respect to the lower housing B so that the distance between the lower and upper sets of work rolls, or in other words, the height of the "pass" can be varied to accommodate material of different gauge or thickness. The base A, as viewed in Fig. 1, extends to the left of the housing B and forms a support for a drive for the work rolls, which drive includes a gear box F and an electric motor G. The drive per se forms no part of the present invention and may be of any conventional construction. Suffice it to say that all of the work rolls are connected thereto by couplings, designated generally by the reference character H, in such a manner that the upper and lower work rolls are simultaneously driven in opposite directions upon actuation of the motor G. The motor G is connected to the mechanism in the gear box F by a flexible belt or the like and the motor is pivotally supported so as to provide means for adjusting the flexible member.

Figure 2:
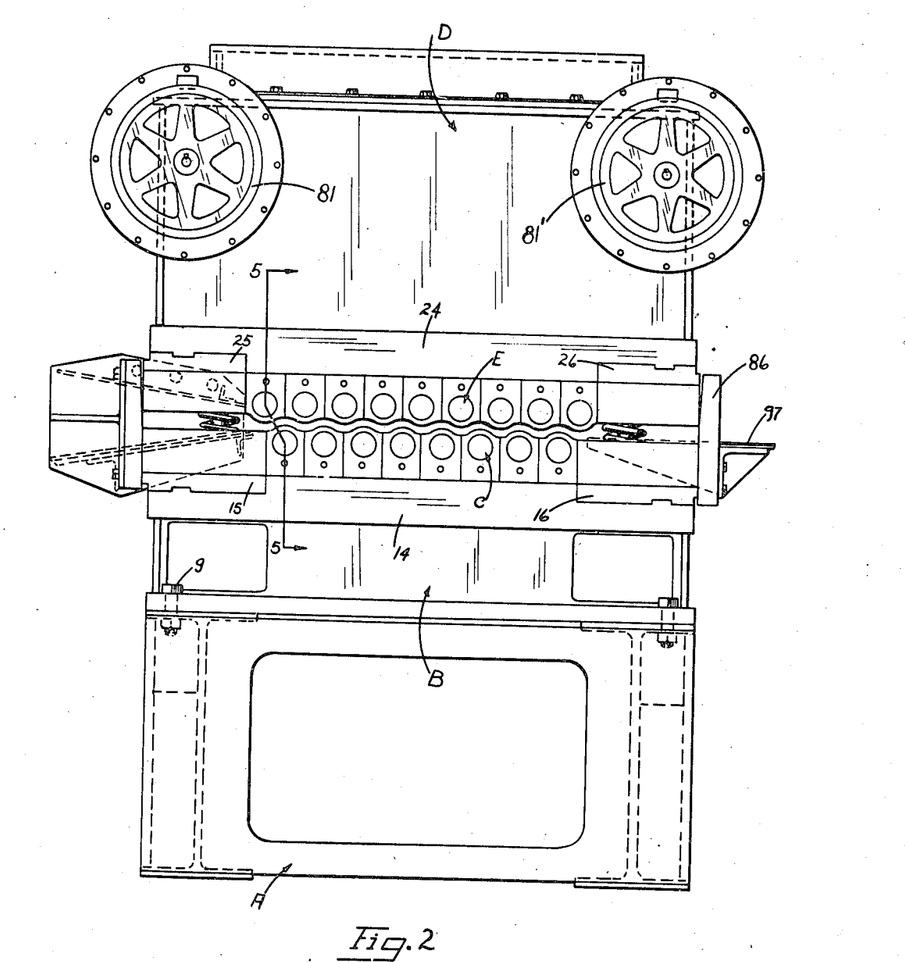
Fig. 2 is a right-hand elevational view of the roller leveler shown in Fig. 1.
Figures 6, 7:
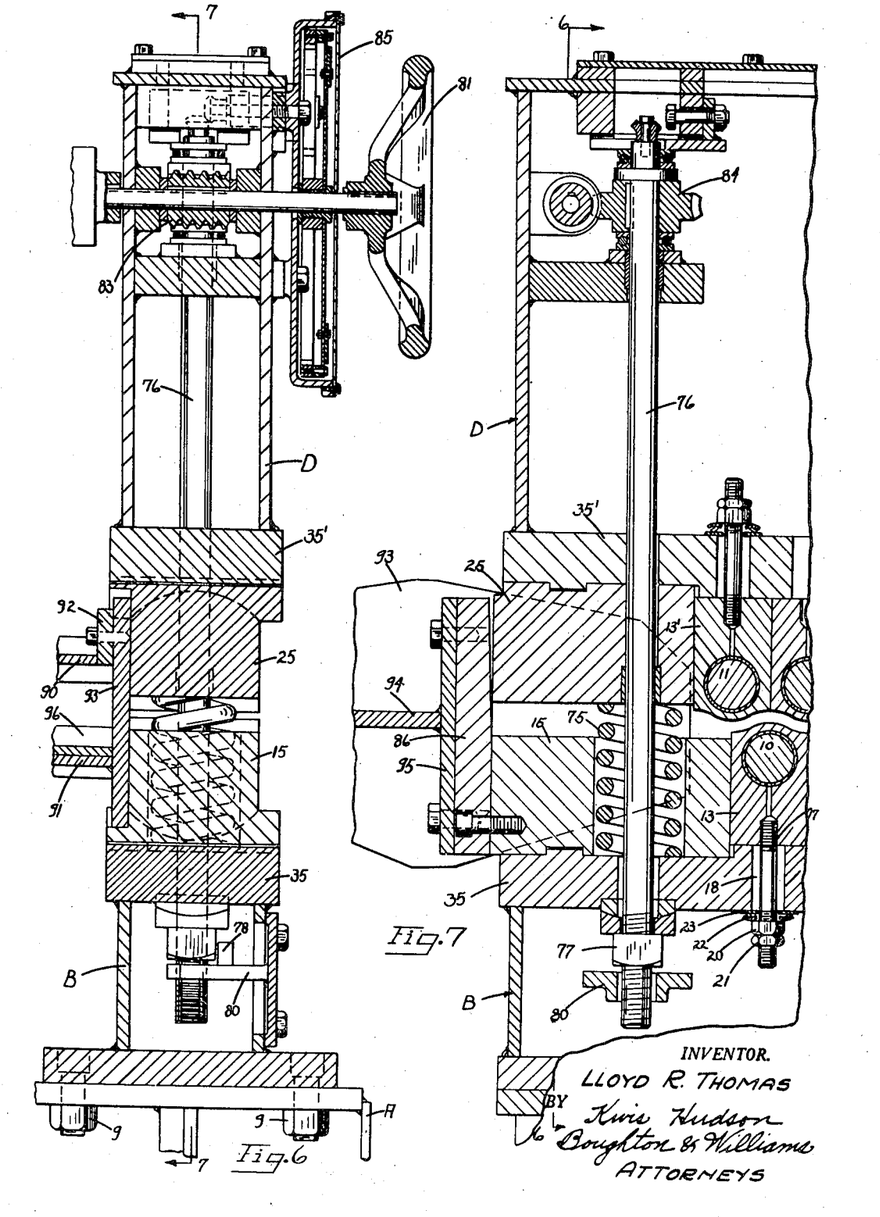
Fig. 6 is a fragmentary sectional view approximately on the line 6—6 of Fig. 7.
Fig. 7 is a fragmentary sectional view approximately on the line 7—7 of Fig. 6.

The lower set of work rolls C, as shown, comprises eight relatively long narrow rolls 10 horizontally arranged, one behind the other, and offset with respect to the upper work rolls 11, of which there are nine, in such a manner as to form therewith a sinuous "pass" for the material being processed. The ends of the work rolls are reduced so as to form necks through the medium of which the rolls are rotatably supported in bushings 12 fixed in individual bearing blocks. The bearing blocks 13 for the lower work rolls 10 are generally rectangular in cross-section, as viewed in Figs. 2 and 7, with the ends thereof adjacent to the -'pass-' curved in a manner shown in the aforesaid figures to provide clearance for the upper bearing blocks 13', thus permitting the work rolls to be moved extremely close together for processing very light sheets.

The lower bearing blocks 13 are located side by side upon a longitudinally extending member 14, which member forms a part of the lower roll housing B. The lower sides of the bearing blocks 13, that is the sides thereof which engage the member 14, are semi-cylindrical, being curved about an axis extending lengthwise of the "pass," and engage within a semi-cylindrical trough in the upper surface of the member 14, which trough extends substantially the length thereof. The bearing blocks 13 are more or less loosely held in the aforesaid position on the member 14 by end members or blocks 15 and 16 fixedly secured to the member 14 and engaging the otherwise free sides of the end bearing blocks 13, and by bolts 17, one for each of the bearing blocks 13, threaded into suitably tapped apertures in the underside of the bearing blocks and projecting downwardly through enlarged holes 18 in the member 14. The lower ends of the bolts 17 are provided with jamb nuts 20, 21 which provide means for adjusting the force exerted by spring washers 22 interposed between the jamb nuts 20 and washers 23 engaging the underside of the member 14.

The upper work rolls 11 are carried by a longitudinally extending member 24 similar to the member 14, which member 24 forms a part of the upper roll housing D. The upper bearing blocks 13' are similar in construction to the lower bearing blocks 13 and are secured to the member 24 in a manner similar to that in which the lower bearing blocks are secured to the member 14, and the corresponding bolts, etc., are designated by the same reference characters with a prime mark affixed thereto. The upper bearing blocks 13' are loosely held between end members or blocks 25 and 26 fixed to the member 24. The construction of the supports for the work rolls 10 and 11 is such that as they flex incident to the passage of material therebetween, the bearing blocks for both the upper and lower rolls may shift or rotate slightly about an axis extending longitudinally of the "pass," with the result that the roll necks always align with their bearings and the provision of excessive clearance therebetween and their bushings or bearings is eliminated. The fact that the bearing blocks for the upper and lower sets of work rolls are placed side by side permits the roll necks to be made relatively large. Reference to the drawings will show that there is very little metal between adjacent roll necks of either set of work rolls as it is only necessary to provide sufficient strength to prevent the bearing block from breaking under the loads to which it is subject during operation, which loads are comparatively light due to the construction employed and the fact that during operation the rolls tend to separate. It will also be noted that since the bearing blocks are located side by side, they reinforce each other. Conventional self-aligning bearings cannot be used because of the limited space.

As previously stated, the work rolls of the present machine are comparatively long and narrow and deflection thereof during operation of the machine is minimized or eliminated by lower and upper banks of back-up rolls or rollers J and J', respectively. In the present instance, two banks of back-up rollers are employed for each set of work rolls, but it is to be understood that any suitable number thereof may be used depending upon the length of the work rolls, etc. In the present instance, the right and left banks of back-up rollers are identical and the lower and upper banks are similar in construction and are supported somewhat similarly in the respective housings B and D. Only the right-hand banks of back-up rollers are herein shown and described in detail.

Figure 3:
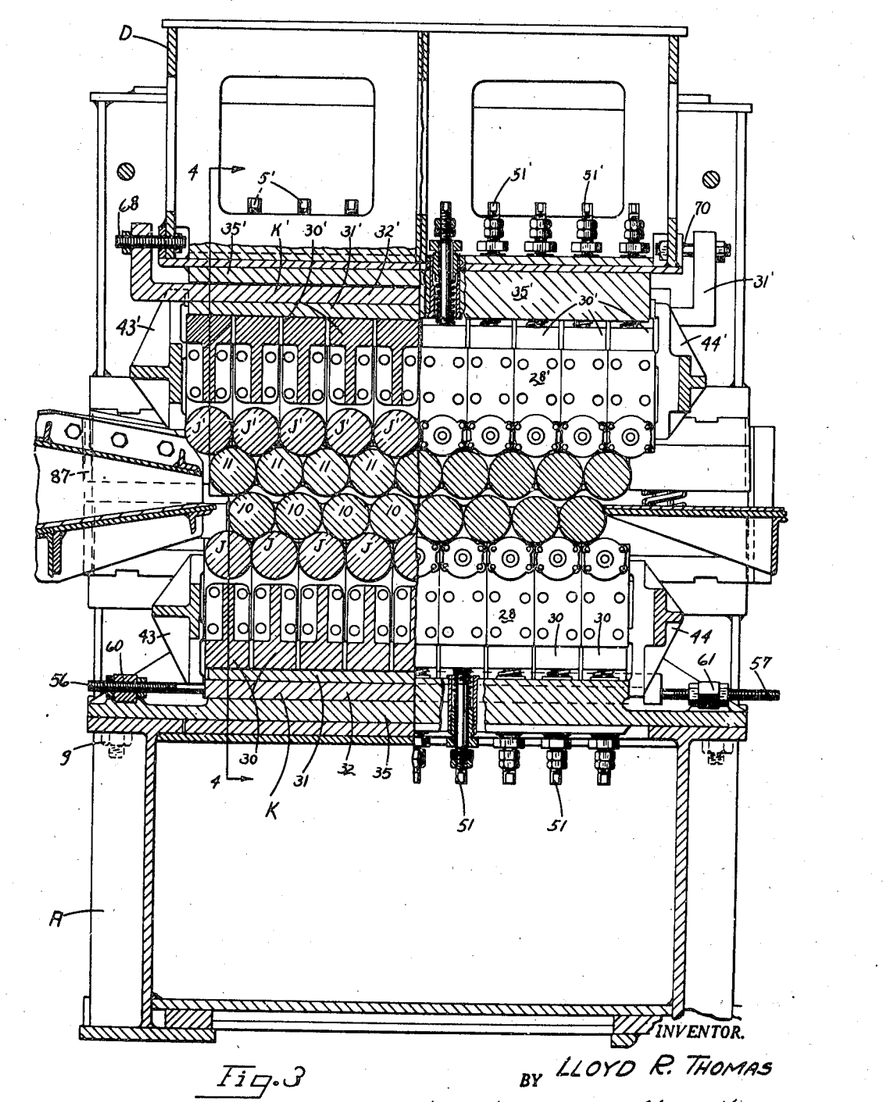
Fig. 3 is a vertical sectional view taken longitudinally through the machine shown in Fig. 1, the left half being approximately on the lines 3—3 and the right half being approximately on the lines 3a—3a of Fig. 4.
Figures 4, 5:
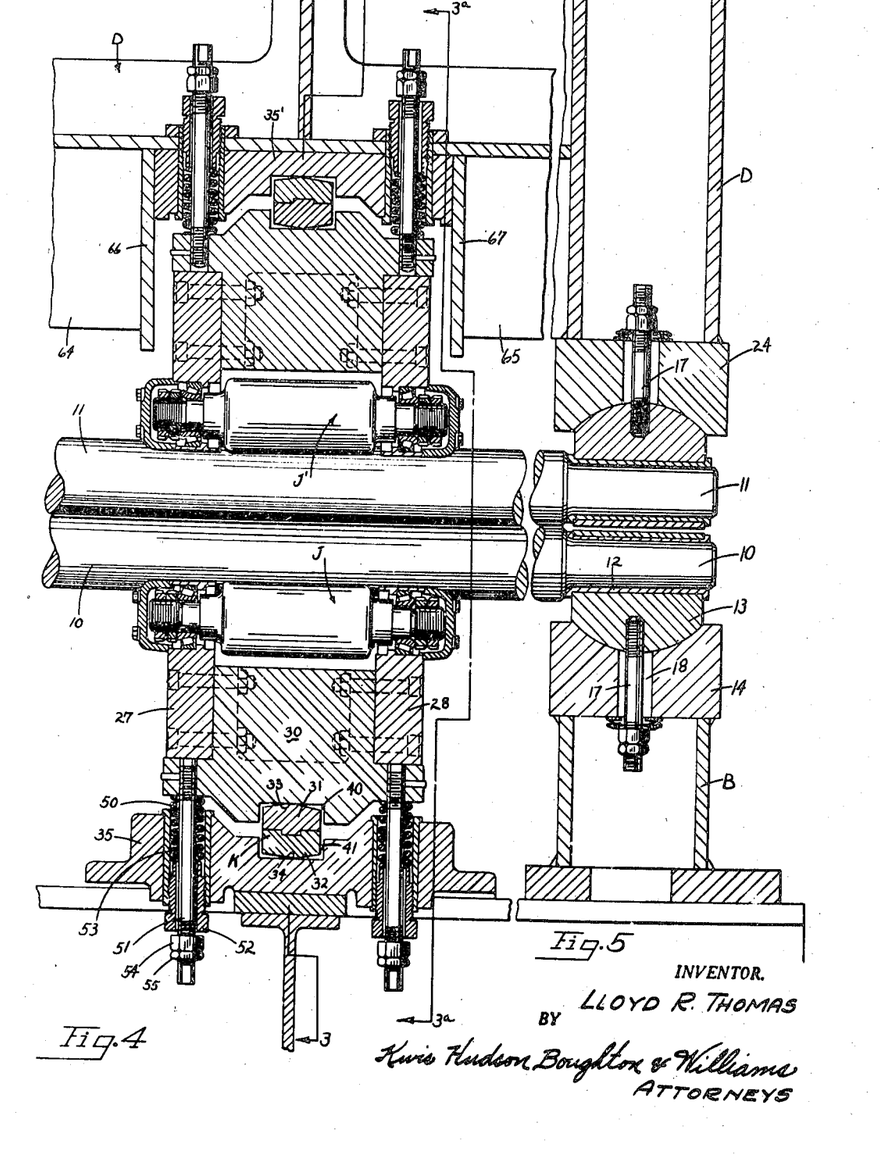
Fig. 4 is a fragmentary sectional view approximately on the line 4—4 of Fig. 3.
Fig. 5 is a fragmentary sectional view approximately on the line 5—5 of Fig. 2.

Referring particularly to Figs. 3 and 4, it will be seen that the back-up rollers J for the lower work rolls 10 are interposed between adjacent work rolls in such a manner that each of the work rolls is back by two back-up rollers. The back-up rollers are rotatably supported by antifriction bearings in bearing blocks 27, 28 bolted or otherwise fixedly secured to members 30 adapted to engage the upper side of a compound wedge K extending substantially the entire length of the machine and comprising relatively movable members 31 and 32, the outside upper and lower surfaces of which are inclined in opposite directions transversely of the length of the wedge, thus providing raised edges 33, 34 about which the member 30 may rotate with respect to the wedge and about which the wedge may rotate with respect to a member 35, respectively. The member 35, which is a part of the lower roll housing B, extends the entire length of the machine, is bolted to the base A, and forms a support for the wedge K and, in turn, the back-up rollers J.

The upper and lower members 31 and 32 of the wedge K are held in assembled relation with respect to each other by a cooperating tongue and groove, the former of which is formed integral with the member 31. The wedge K is held in assembled relation with respect to the members 30 and 35 by being partially enclosed in oppositely facing grooves 40 and 41 in the members 30 and 35. The members 30 are located side by side upon the member 31 of the wedge K and are held in assembled position thereon by brackets 43, 44 bolted to parts of the base A. The front bracket 43 is bolted, as by bolts 45, to upwardly extending projections 46 and 47 on the front end of the member 35 and the bracket 44 is bolted to similar projections on the rear end of the member 35.

The back-up rollers J are frictionally driven by the work rolls and, according to the provisions of the present invention, are continuously held in engagement with the work rolls so as to be driven therewith at all times. For this purpose, the members 30 and, in turn, the back-up rollers J carried thereby are continuously urged towards the work rolls by compression springs 50, two for each member 30, surrounding bolts 51 threaded into suitably tapped apertures adjacent to the ends of the members 30 and projecting downwardly through the member 35. The springs 50 are interposed between the undersides of the members 30 and sleeve-like members 52 adjustably threaded into bushing members 53 fixed in the members 35. The sleeve-like members 52 surround the bolts 51, however, sufficient clearance is provided to permit limited sidewise movement of the bolts therein. The lower ends of the bolts 51 are provided with jamb nuts 54, 55 which are so positioned with respect to the sleeve-like members 52 that they permit limited longitudinal movement of the bolts relative to the members 51. The construction is such that the members 30 and, in turn, the back-up rollers J carried thereby, are continuously urged into engagement with the work rolls 10, are continuously frictionally driven thereby at the same peripheral speed, and are free to align themselves with the work rolls under all normal conditions of operation.

Movement of the members 30 and, in turn, the back-up rollers J in a direction away from the "pass" is limited by the compound wedge K comprising the longitudinally movable members 31, 32. For the purpose of varying or adjusting the thickness of the compound wedge, the members 31 and 32 have threaded rods 56 and 57, respectively, formed integral therewith, which rods extend through members 60 and 61 engaged by fixed abutments on the members 35. The adjustment of the respective members is accomplished by nuts threaded on the rods 56 and 57 and engaging opposite sides of the members 60 and 61. The construction is such that the pre-deflection or the deflection of the work rolls 10 can be controlled by varying the thickness of the wedge K. Attention is called to the fact that the back-up rollers are individually supported on the wedge K and individually urged into continuous contact with the work rolls, with the result that they can individually align themselves with the work rolls and are continuously driven thereby regardless of the conditions existing in the machine at any particular time.

The upper back-up rollers J' are similar in construction to the lower back-up rollers J and are supported in the upper roll housing D in a manner similar to that in which the back-up rollers J are supported in the lower roll housing B and the construction will not be redescribed in detail. Suffice it to say that the corresponding parts are designated by the same reference characters with a prime mark affixed thereto, that the brackets 43' and 44' are bolted to transversely extending plates forming a part of the upper roll housing D in place of the upstanding projections on the member 35, as was the case with respect to the brackets 43 and 44, and that the manner in which the relatively movable parts 31' and 32' of the wedge K' are adjusted is slightly different because of the slightly different construction of the upper roll housing D.

The front bracket 43' is bolted to the plates 62, 63 and the rear bracket 44' is bolted to the plates 64, 65. The plates 62 and 64 are connected together by a longitudinally extending plate 66 and the plates 63 and 65 are connected together by a similar longitudinally extending plate 67. The member 35' abuts the plates 66 and 67 and to this extent are slightly different in shape from the member 35. The front end of the member 32, see Fig. 3, extends beyond the member 35' which is slightly shorter than the member 35, and the projecting end thereof has an upwardly extending flange through the medium of which the member is adjusted relative to the member 31' by a double ended bolt 68 projecting therethrough and through a part of the upper roll housing D. The adjustment is effected by suitable nuts on the bolt 68. The right-hand end of the member 31' of the wedge K' is similarly constructed and the member is adapted to be moved relative to the member 32' in a similar manner by means including a double-ended bolt 70.

As previously stated, the upper and lower sets of work rolls are movable or adjustable relative to each other to vary the height of the "pass" therebetween. For this purpose the upper roll housing D is movable vertically with respect to the lower roll housing B. As shown, the upper roll housing D is supported upon the lower roll housing B by compression springs 75, one of which is located at each of the four corners of the housings. The springs 75 continuously urge the upper roll housing D in an upward direction, however, upward movement thereof is limited by rods 76 also located at the respective corners of the housings, which rods are rotatably supported in the upper roll housing D but held against longitudinal movement relative thereto. The lower ends of the rods 76 extend downwardly through the springs 75 into the interior of the lower roll housing B where they are provided with adjustable nuts 77 normally held against rotation by projections 78 on members 80 bolted or otherwise detachably fixed to the lower roll housing B.

The two rods 76 at the front corners of the machine are adapted to be simultaneously rotated to raise or lower the front end of the upper roll housing D by a hand wheel 81 secured to the projecting end of a shaft 82 extending transversely of the machine and rotatably supported in the upper part of the housing D. The shaft 82 is provided with worms 83 keyed thereto, which worms are continuously in mesh with worm wheels 84 keyed to the rods 76 adjacent to their upper ends. The construction is such that the rods 76 located at the front corners of the machine are simultaneously rotated upon rotation of the hand wheel 81 while the nuts 77 are held against rotation by the projection 78 on the member 80. The rods 76 located at the rear corners of the machine are adapted to be simultaneously rotated in a similar manner by a hand wheel 81'. Both hand wheels 81 and 81' are provided with indicating devices, designated generally by the reference character 85, which indicate the height or opening of the "pass" at either end of the machine. The entrance and exit ends of the "pass" may be adjusted individually so that sheets of different gauge may be processed and the corrugations rolled therein at the entrance end of the "pass" rolled out adjacent to the exit end thereof.

The upper roll housing D is guided in its vertical movement by a plurality of members 86 bolted or otherwise secured to the lower housing B. As shown, the members 86 on the right-hand side of the machine are bolted to the end blocks 15 and 16 and the members 86 at the opposite side of the machine to the corresponding members. The members 86 project upwardly from the lower roll housing B to a point above the lower portion of the upper roll housing D. In the embodiment shown, the members 86 extend substantially to the top of the end blocks 25 and 26 and their corresponding blocks at the opposite side of the machine. The members 86 at the left-hand side of the machine are provided with vertically positioned keys 87 which engage within suitable keyways in the ends of the upper roll housing D. The keys 87 prevent the upper housing D from shifting transversely of the lower housing B and the members 86 maintain the housings aligned in other respects. Considerable clearance is provided between the upper ends of the members 86 and the portions of the upper roll housing D adjacent thereto as clearly shown in Figs. 2 and 7, which clearance permits the upper roll housing D to be tilted incident to adjusting the height of the "pass" by the hand wheels 81 and 81'.

For the purpose of facilitating the feeding of sheet material to the machine, the entrance end of the machine is provided with guide means comprising transverse upper and lower horizontal members 90 and 91, which members converge towards the rear. Opposite ends of the member 90 are welded to side members 92 which in turn are bolted to vertical plates or members 93. Opposite ends of the member 91 are welded directly to the end members 93. The end members 93 are, in turn, welded to brackets comprising plates 94 and 95, which brackets are detachably bolted to the members 86 at the front of the machine. The upper surface of the member 91 is preferably provided with a facing 96 of some wear-resisting material, such as "Micarta." The rear end of the machine is provided with a transversely extending shelf 97 for assisting in guiding the material as it leaves the "pass."

Figures 8, 9:
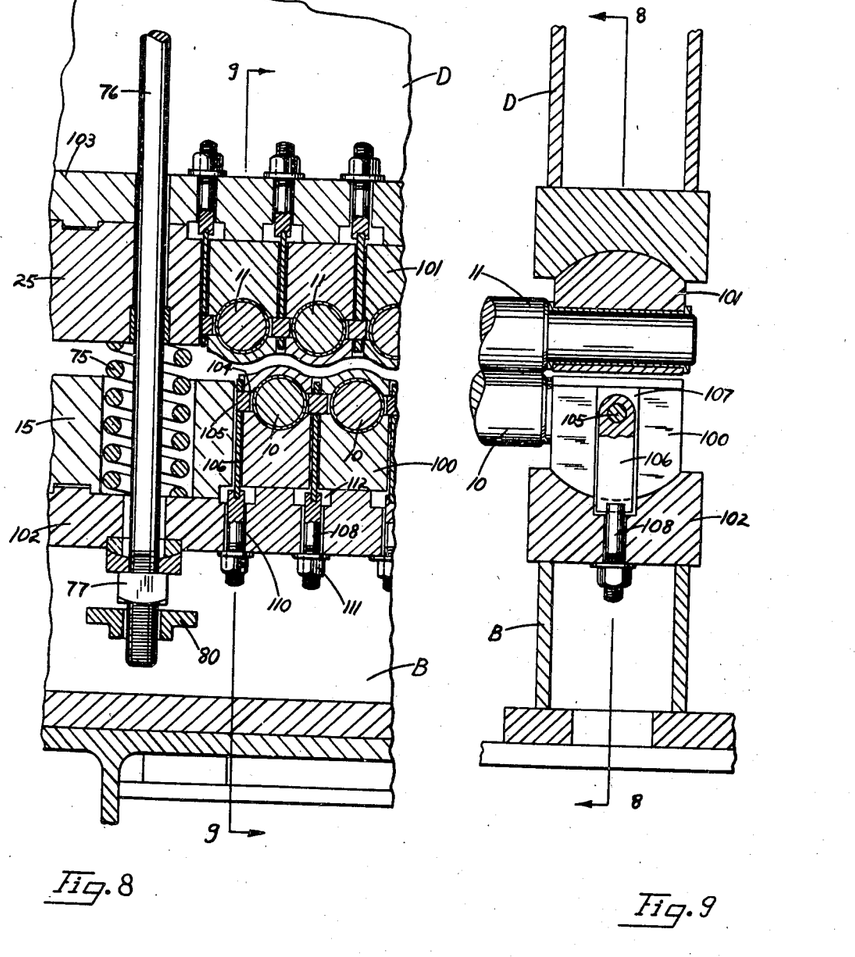
Fig. 8 is a fragmentary sectional view somewhat similar to Fig. 7, approximately on the line 8—8 of Fig. 9 and showing a modified construction of roll bearing.
Fig. 9 is a fragmentary sectional view, with portions in elevation, approximately on the line 9—9 of Fig. 8.

The preferred embodiment of the invention described is merely illustrative of the invention and a modified construction for supporting the work rolls while permitting individual limited adjustment thereof is illustrated in Figs. 8 and 9 wherein corresponding parts are designated by the same reference characters. Referring to these figures, the work rolls 10 and 11 are rotatably supported in bearing blocks 100, 101, respectively, similar in construction to the bearing blocks 13 except for the manner in which they are held in engagement with the longitudinally extending supporting members 102, 103 corresponding with the supporting members 35 and 35', respectively, of the construction shown in the preceding figures. As shown, the bearing blocks 100 are provided with transversely extending horizontal cylindrical apertures 104, the centers of which intersect the center lines of the work rolls 10, through the medium of which apertures the bearing blocks 100 are connected to the frame member 102 by bosses 105 carried by vertically extending members 106 interposed between adjacent bearing blocks 100 and located in suitable grooves 107 formed therein. The lower ends of the members 106 are welded or otherwise fixed to the upper ends of bolts 108 projecting downwardly through enlarged openings 110 in the member 102. The lower ends of the bolts 108 are provided with suitable nuts 111 through the medium of which the bearing blocks 100 may be adjustably held in more or less loose engagement with the cooperating semi-cylindrical surfaces on the longitudinal member 102. In practice the nuts 111 are so adjusted that the bearing blocks 100 are relatively free to rotate with respect to the member 102. As shown, the upper surface of the member 102 is cut out as at 112 to provide clearances for the members 106. The upper bearing blocks 101 are connected to the upper supporting member 103 in a manner similar to that in which the bearing blocks 100 are connected to the member 102 and the construction will not be redescribed.

While in the preferred embodiment of the invention shown individual mountings for each of the back-up rollers are employed, the present invention contemplates any construction which permits the back-up rollers to follow the deflection of the work rolls and continuously engage the same irrespective of the operating conditions existing at any particular time. A modified construction for accomplishing this purpose might comprise mounting the back-up rollers in pairs and pivotally connecting each pair to an individual mounting.

From the foregoing description of the preferred embodiment, it is believed that the operation of the machine disclosed will be apparent and it will be seen that the objects heretofore enumerated and others have been accomplished and that there has been provided a novel and improved roller leveler capable of processing sheet material at higher speeds than heretofore possible. The fact that the roll necks are relatively larger for any given size of roll, or, conversely, the diameters of the roll are smaller for any given size of roll neck, permits the machine to be operated at a faster speed while performing any given amount of work or flexing than was possible with prior machines used for the same purpose. It will also be apparent that adequate provision has been made for taking care of deflection and predeflection of the rolls. While the preferred embodiment of the invention has been described in detail, it is to be understood that the invention is not limited to the particular construction shown and described, and it is my intention to hereby cover all adaptations, modifications and uses thereof which come within the practice of those skilled in the art to which the invention relates and within the spirit and scope of the appended claims.

Having thus described my invention, I claim:

1. In a roller leveler of the character described, the combination of a plurality of generally parallel rolls arranged one behind the other and means for supporting said rolls comprising a plurality of adjoining members arranged one behind the other and independently and indirectly movable by work passing through the machine about axes extending transversely of the axes of rotation of the rolls.

2. In a roller leveler of the character described, the combination of a plurality of generally parallel rolls arranged one behind the other and means for supporting said rolls comprising a plurality of members located side by side, one for each of said rolls, said members being arranged one behind the other and independently movable about axes extending transversely of the axes of rotation of the rolls.

3. In a roller leveler of the character described, the combination of a plurality of generally parallel rolls arranged one behind the other and means for supporting the adjacent ends of said rolls comprising a plurality of members located side by side and independently movable about axes extending transversely of the axes of rotation of the rolls.

4. In a roller leveler of the character described, the combination of a plurality of generally parallel rolls arranged one behind the other and means for supporting the adjacent ends of said rolls comprising a plurality of members, one for each of said rolls, arranged side by side and independently movable about axes extending transversely of the axes of rotation of the rolls.

5. In a roller leveler of the character described, the combination of two sets of work rolls arranged in offset relation to define a sinuous pass therebetween and means for supporting a plurality of said rolls comprising a plurality of members located side by side and arranged one behind the other and independently movable about axes extending transversely of the axes of rotation of the rolls.

6. In a roller leveler of the character described, the combination of two sets of work rolls arranged in offset relation to define a sinuous pass therebetween and means for supporting a plurality of said rolls comprising a plurality of members, one for each of the rolls, located side by side and arranged one behind the other and independently movable about axes extending transversely of the axes of rotation of the rolls.

7. In a roller leveler of the character described, the combination of: two sets of work rolls arranged in offset relation to define a sinuous pass therebetween; and means for supporting the adjacent ends of a plurality of said rolls comprising a plurality of members, one for each of the rolls, located side by side and arranged one behind the other and independently movable about axes extending transversely of the axes of rotation of the rolls.

8. In a roller leveler of the character described, the combination of: two sets of work rolls arranged in offset relation to define a sinuous pass therebetween; means for supporting the adjacent ends of the rolls of each set; said means comprising sets of members located side by side and arranged one behind the other and independently movable about axes extending transversely of the axes of rotation of the rolls.

9. In a roller leveler of the character described, the combination of: a housing, a set of generally parallel rollers arranged one behind the other; and means comprising a plurality of members arranged side by side and independently movable about axes extending transversely of the axes of rotation of said rolls for supporting said rolls in said housing.

10. In a roller leveler of the character described, the combination of: two relatively adjustable roll housings; sets of tandem arranged generally parallel rolls, one set for each of said roll housings; and means for supporting opposite ends of each of said sets of rolls in their respective roll housings; each of said means comprising a plurality of members arranged side by side and individually movable about axes extending transversely of the axes of rotation of the rolls.

11. In a roller leveler of the character described, the combination of: a housing; a plurality of members located side by side; said housing and said members having adjoining transversely curved surfaces; and a plurality of generally parallel work rolls arranged one behind the other and having their adjacent ends rotatably carried by said members.

12. In a roller leveler of the character described, the combination of: a housing; a plurality of closely spaced small diameter generally parallel work rolls; and means comprising a plurality of members located side by side for supporting said rolls in said housing; said housing and said members having adjoining curved surfaces whereby said members may move independently of each other about axes extending transversely of the axes of rotation of the rolls.

13. In a roller leveler of the character described, the combination of: a frame comprising upper and lower roll housings; upper and lower sets of work rolls each set comprising a plurality of small diameter generally parallel work rolls arranged in substantially the same plane; said housing comprising bearing surfaces curved in a direction transversely of the axes of rotation of the rolls; and means including a plurality of members located side by side and having curved bearing surfaces engaging the curved bearing surfaces of said frame for rotatably supporting said work rolls of each set in closely spaced relation.

14. In a roller leveler of the character described, the combination of: two sets of relatively small diameter long work rolls each set comprising a plurality of closely spaced rolls arranged substantially in the same plane and offset with respect to the rolls of the other set so as to form therewith a sinuous path for material to be worked; a frame comprising upper and lower roll housings having bearing surfaces curved about axes extending in a direction at right angles to the direction of the axes of the work rolls; a plurality of sets of members, one set for each end of said sets of work rolls, each set of members comprising a plurality of members located side by side and having curved bearing surfaces engaging one of the curved bearing surfaces on said frame; yieldable means for continuously urging said members in a direction to engage the curved bearing surfaces on said frame; and means for rotatably supporting said work rolls in said members.

15. In a roller leveler of the character described, the combination of: two sets of relatively small diameter long work rolls each set comprising a plurality of closely spaced rolls arranged substantially in the same plane and offset with respect to the rolls of the other set so as to form therewith a sinuous path for material to be worked; means including a frame comprising upper and lower roll housings having bearing surfaces curved about axes extending at right angles to the axis of the work rolls for supporting said work rolls; a plurality of sets of members, one set for each end of said sets of work rolls; each of said sets of members comprising a plurality of members located side by side and having curved bearing surfaces engaging one of the curved bearing surfaces on said frame; means for pivotally connecting said members to said frame for movement about said curved surfaces, and means for rotatably supporting said work rolls in said members.

16. In a roller leveler of the character described, the combination of: two sets of relatively small diameter long work rolls each set comprising a plurality of closely spaced rolls arranged substantially in the same plane and offset with respect to the rolls of the other set so as to form therewith a sinuous path; means for supporting said work rolls; said means including a frame comprising upper and lower roll housings having elongated bearing surfaces curved about axes extending at right angles to the axis of the work rolls; a plurality of sets of members, one set for each end of said sets of work rolls; each set of members comprising a plurality of members located side by side and having curved bearing surfaces engaging one of said curved bearing surfaces on said frame; means for rotatably supporting said work rolls in said members; a plurality of back-up rolls engaging said work rolls; means for supporting said back-up rolls for individual movement towards and from said work rolls; means for limiting the movement of said back-up rolls in a direction away from said work rolls; and yieldable means for continuously urging said back-up rolls in a direction to engage said work rolls.

17. In a roller leveler of the character described, the combination of a frame, two sets of relatively small diameter long work rolls each set comprising a plurality of closely spaced rolls arranged substantially in the same plane and offset with respect to the rolls of the other set so as to form therewith a sinuous path for material passing therebetween, means for rotatably supporting said work rolls in said frame, a plurality of back-up rolls engaging said work rolls, means for supporting said back-up rolls for individual movement towards and from said work rolls, means for limiting the movement of said back-up rolls in a direction away from said work rolls, and means for continuously urging said back-up rolls in a direction to engage said work rolls.

18. In a roller leveler of the character described, the combination of a frame, two sets of relatively small diameter long work rolls each set comprising a plurality of closely spaced rolls arranged substantially in the same plane and offset with respect to the rolls of the other set so as to form therewith a sinuous path, means for rotatably supporting said work rolls in said frame, a plurality of back-up rolls engaging said work rolls, individual housings for said back-up rolls, means for supporting said back-up roll housings for individual universal movement relative to said work rolls, means for limiting the movement of said back-up roll housings in a direction away from said work rolls, and means for continuously urging each of said back-up roll housings in a direction to engage said work rolls.

LLOYD R. THOMAS.

REFERENCES CITED

The following references are of record in the file of this patent:

UNITED STATES PATENTS

| Number | Name | Date |
| --- | --- | --- |
| 1,911,321 | Long | May 30, 1933 |
| 1,970,911 | Hartmann | Aug. 21, 1934 |
| 2,295,017 | Shields | Sept. 8, 1942 |
| 2,365,114 | Shields | Dec. 12, 1944 |
| 1,697,090 | Russell | Jan. 1, 1929 |
| 2,254,461 | Todd | Sept. 2, 1941 |
| 2,091,789 | Maussnest | Aug. 31, 1937 |
| 2,219,163 | Maussnest | Oct. 22, 1940 |